United States Patent
Robinson et al.

(10) Patent No.: US 6,577,949 B1
(45) Date of Patent: Jun. 10, 2003

(54) METHOD AND SYSTEM FOR EXCHANGING ROUTING DATA BETWEEN END USERS

(75) Inventors: Richard Robinson, Lindenhurst, IL (US); Brian Walton, Oak Park, IL (US); Jean K. Ohler, Bloomingdale, IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 09/718,752

(22) Filed: Nov. 22, 2000

(51) Int. Cl.[7] .............................................. G01C 21/30
(52) U.S. Cl. ........................... 701/209; 701/23; 701/35; 701/201; 340/988; 340/993; 707/10; 709/217
(58) Field of Search ............................... 701/23, 25, 35, 701/200, 201, 209, 214; 340/988, 991, 993, 994; 707/10, 100; 709/217, 219, 225

(56) References Cited

U.S. PATENT DOCUMENTS

| | | | |
|---|---|---|---|
| 5,523,950 A | 6/1996 | Peterson | 455/456 |
| 6,081,609 A | 6/2000 | Narioka | 382/113 |
| 6,141,609 A | 10/2000 | Herdeg et al. | 701/35 |
| 6,148,090 A | 11/2000 | Narioka | 382/113 |
| 6,199,010 B1 | 3/2001 | Richton | |
| 6,300,946 B1 | 10/2001 | Lincke et al. | 345/326 |
| 6,339,746 B1 * | 1/2002 | Sugiyama et al. | 701/209 |
| 2001/0044693 A1 * | 11/2001 | Gotou et al. | 701/202 |

* cited by examiner

*Primary Examiner*—Gertrude Arthur
(74) *Attorney, Agent, or Firm*—Jon D. Shutter; Frank J. Kozak; Lawrence M. Kaplan

(57) ABSTRACT

A method and system that provides end users with the ability to exchange routing data. A route recorder application on a first computing system provides a first end user with the ability to define a route formed of specific road segments and store data that represent the route in a data file. The data file is distributed to a second end user who uses the data that represent the route in a second computing system to provide guidance for following the route.

20 Claims, 3 Drawing Sheets

METHOD AND SYSTEM FOR EXCHANGING ROUTING DATA BETWEEN END USERS

REFERENCE TO RELATED APPLICATION

The present application is related to the copending application entitled "METHOD AND SYSTEM FOR PROVIDING RELATED NAVIGATION SERVICES FOR TWO OR MORE USERS", filed on even date herewith, the entire disclosure of which is incorporated by reference herein.

BACKGROUND OF THE INVENTION

The present invention relates to computer-based systems that provide navigation-related features and more particularly the present invention relates to providing a means that enables end users of computer-based systems that provide navigation-related features to exchange data that define routes.

Navigation systems are available that provide end users (such as drivers and passengers of the vehicles in which the in-vehicle navigation systems are installed) with various navigation-related functions and features. For example, some navigation systems are able to determine an optimum route to travel by roads between locations in a geographic region. Using input from the end user, and optionally from equipment that can determine one's physical location (such as a GPS system), a navigation system can examine various routes between two locations and determine an optimum route to travel from a starting location to a destination location in a geographic region. The navigation system may then provide the end user with information about the optimum route in the form of guidance that identifies the driving maneuvers required to be taken by the end user to travel from the starting location to the destination location. The guidance may take the form of visual and/or audio instructions that are provided along the way as the end user is traveling the route. Some navigation systems are able to show detailed maps on computer displays outlining routes to destinations, the types of maneuvers to be taken at various locations along the routes, locations of certain types of features, and so on.

In order to provide these and other navigating functions, navigation systems use geographic data. The geographic data may be in the form of one or more databases that include data that represent physical features in a geographic region. The geographic database may include data representing the roads and intersections in a geographic region and also may include information relating to the represented roads and intersections in the geographic region, such as turn restrictions at intersections, speed limits along the roads, street names of the various roads, address ranges along the roads, and so on.

Although navigation systems provide many important features, there continues to be room for new features or other improvements. One area in which there is room for improvement relates to providing a way for end users to exchange routing data. As an example, a first person may know a particular route that he/she would like to share with another person. The first person may know that the particular route is faster or safer than other routes and the first person may want to share this information with one or more other persons. As an example, a business may want to provide customers with routing information to avoid a construction site. As another example, a business may want delivery trucks to follow a route to a particular entrance gate to avoid a school crossing. There are numerous other examples.

A person can provide written or oral directions for following a particular route to a destination. However, there are disadvantages associated with written or oral directions. One important consideration is that the person to whom the written or oral directions is given may be using a navigation system that is providing driving directions to the destination. These driving directions may be different from the oral or written driving directions for following the particular route. In these circumstances, it would be useful if the directions for following the particular route could be provided in a manner such that the navigation system of the person receiving the directions could incorporate the directions and provide directions for following the route.

SUMMARY OF THE INVENTION

To address these and other objectives, the present invention comprises a method and system that provides end users with the ability to exchange routing data. A route recorder application on a first computing system provides a first end user with the ability to define a route formed of specific road segments and store data that represent the route in a data file. The data file is distributed to a second end user who uses the data that represent the route in a second computing system to provide guidance for following the route.

DETAILED DESCRIPTION OF THE PRESENTLY PREFERRED EMBODIMENTS

I. Embodiment with Navigation Services Provider
A. Overview

Figure 1:
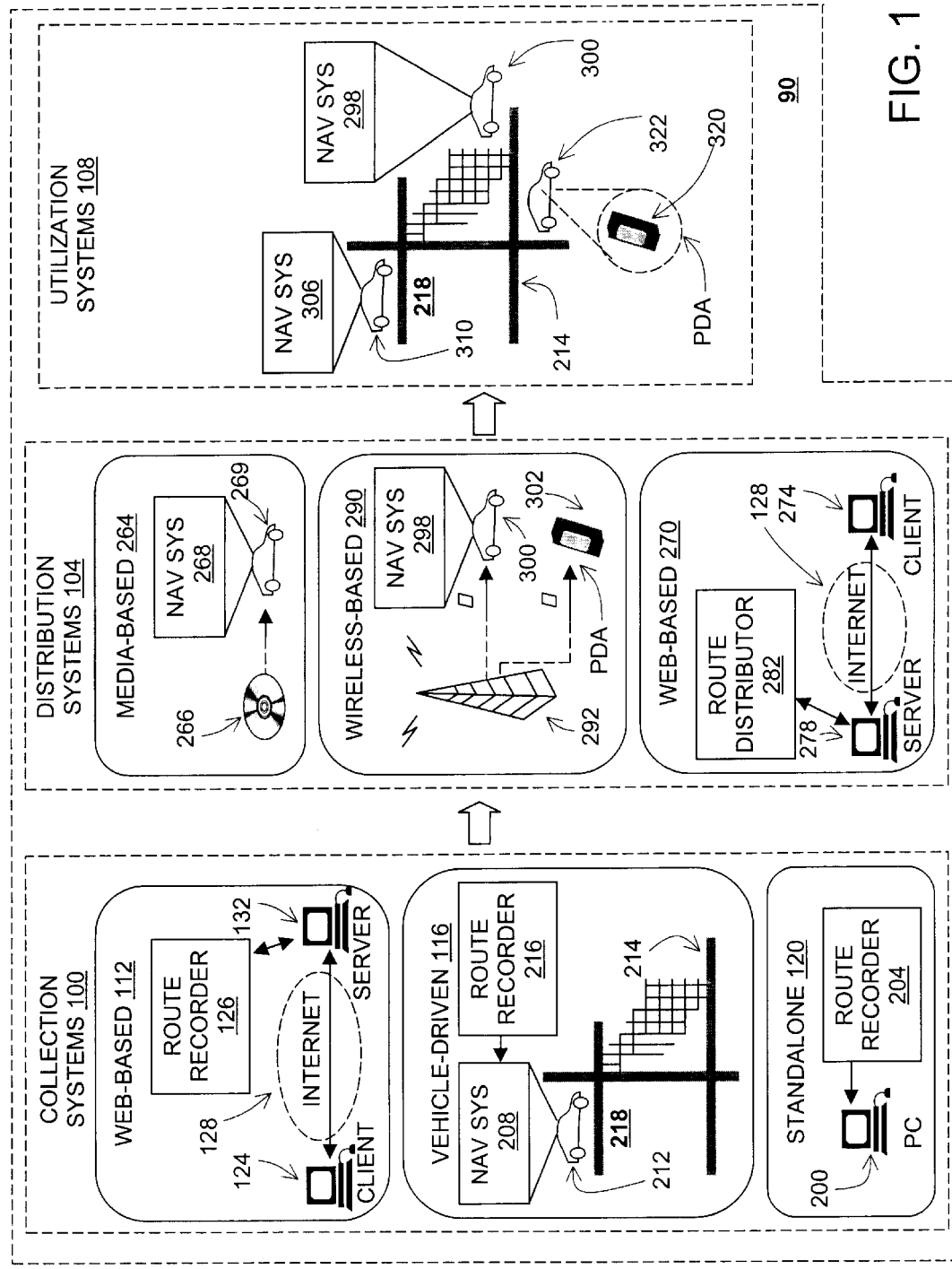
FIG. 1 is a diagram illustrating categories of component systems that form alternative embodiments of the present invention.

FIG. 1 shows an overall system 90 that enables end users to exchange data about routes with other end users. In general, there are three main functions involved in enabling end users to exchange data about routes with other end users. First, end users (i.e., "end user/recorders") are provided with a means to define routes and store data that define the routes. Second, the end users who defined the routes are provided with a means to distribute the data that define the routes. Third, other end users (i.e., "end user/recipients") are provided with a means to use the data that define the routes. There are various means by which each of these three main functions can be accomplished.

Referring to FIG. 1, three categories are shown. FIG. 1 shows a collection systems category 100, a distribution systems category 104 and a utilization systems category 108. Each of these categories relates to one of the main functions mentioned above. Within each category are shown various alternative embodiments of systems that can be used to accomplish the function associated with the category. In general, any system in one category can be used with any system from either of the other categories.
B. Collection Systems Included in the collection systems category 100 are a web-based route data collection system 112, a vehicle-driven route data collection system 116, and a standalone route data collection system 120. Each of these systems may be used by an end user/recorder (also referred to as a "first end user") to record and store data that define a route. Referring first to the web-based route data collection system 112, this system includes a client system 124. The client system 124 includes any type of device that can connect to the Internet 128. The client system 124 includes appropriate hardware and software that enables the end user/recorder using the client system 124 to connect to the Internet 128. As examples, the client system 124 can be a personal computer, a terminal, an Internet appliance, a web-enabled phone, a personal digital assistant (PDA), etc. The web-based system 112 also includes a server system 132. The server system 132 is accessed over the Internet 128 by the client system 124. The server system 132 includes a route recorder application 136. When the end user/recorder uses the client system 124 to access the server system 132 over the Internet 128, the route recorder application 136 allows the end user/recorder to define and store a route.

Figure 2:
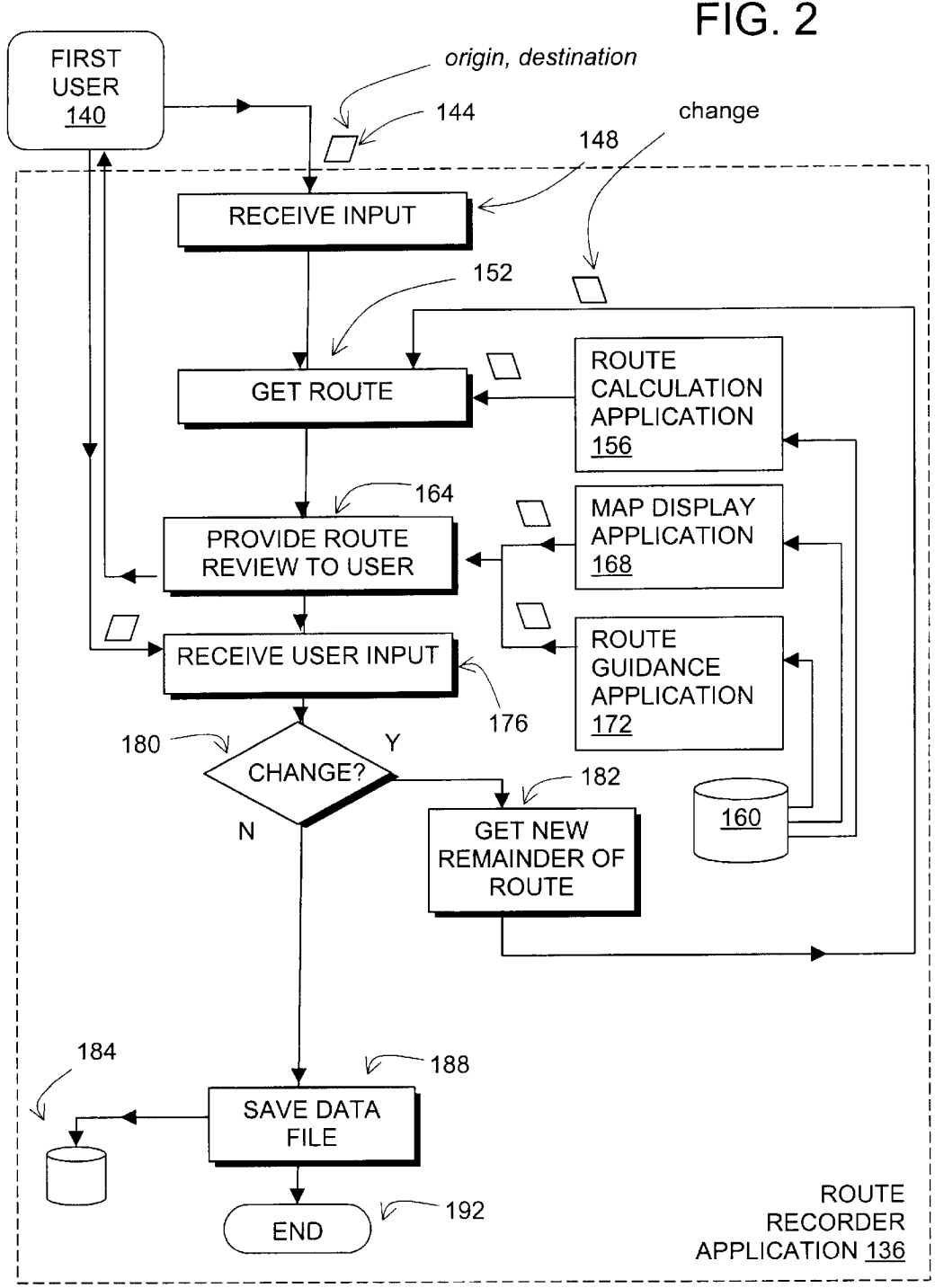
FIG. 2 is a flowchart showing the steps performed by the route recorder in FIG. 1.

FIG. 2 shows the steps in a process performed by the route recorder application 136. A user/recorder 140 provides data 144 indicating an origin and destination to the route recorder application 136. The user/recorder 140 uses the client system 124 to access the route recorder application 136 which is located over the Internet 128 on the server system 132. As an example, the route recorder application 136 may present the user/recorder 140 with a menu and blank data fields into which the user/recorder can enter information that defines an origin and a destination. Alternatively, the route recorder application 136 may provide the user/recorder 140 with a graphical map on the display screen of the client system 124. The map can be panned and zoomed in order to allow the user/recorder 140 to identify geographic locations for the origin and destination by pointing-and-clicking locations on the map being displayed.

The route recorder application 136 receives the data 144 indicating an origin and destination from the user/recorder 140 (Step 148). Using the data 144 input by the user/recorder 140, the route recorder application 136 determines a route (Step 152). In the embodiment of FIG. 2, the route recorder application 136 calls a route calculation application 156 and provides the data 144 defining the origin and destination to the route calculation application 156. The route calculation application 156 may use any known means to determine a route between the origin and destination. Examples of methods that the route calculation application 156 can use to determine a route are described in the copending patent application Ser. No. 09/047,698, filed Mar. 25, 1998, the entire disclosure of which is incorporated by reference herein.

When the route calculation application 156 determines a solution route, it uses a geographic database 160. The geographic database 160 includes data about the geographic features in a covered area, including data about the roadway network in the covered geographic area. In one embodiment, the geographic database 160 includes node data records and segment data records. Node data records represent physical locations in the geographic area (such as roadway intersections and other positions) and segment data records represent portions of roadways between the physical locations represented by nodes. Each road segment in the geographic region is represented by a road segment data entity (i.e., a record) in the geographic database 160. Each road segment data record in the geographic database 160 has two nodes which represent the coordinate positions at each end of the road segment represented by the road segment data record. The data records include information that can be used during route calculation, such as turn restrictions, vehicle access, restricted driving conditions, etc. (The terms "nodes" and "segments" represent only one terminology for describing these physical geographic features and other terminology for these feature is intended to be encompassed within the scope of these concepts.

When calculating a solution route, the route calculation application 156 determines a plurality of road segments that form a continuous path between the origin and destination. The solution route conforms to known traffic restrictions. The solution route may also be optimized for certain criteria, e.g., least travel time, shortest distance, and so on.

After the route calculation application 156 determines a solution route, the route recorder application provides 136 a means by which the user/recorder 140 can review and change the route (Step 164). There are several ways that the route recorder application 136 can provide the route to the user/recorder 140 for review.

One way that the route recorder application 136 can provide the route to the user/recorder 140 for review is to display the route graphically on the display of the client system 124 that the user/recorder 140 is using to operate the route recorder application 136. When the route information is displayed graphically to the user/recorder 140, the path of the route may be highlighted on a map displayed graphically on the client system 124. The route recorder application 136 uses a map display application 168 for this purpose. The map display application 136 uses data from the geographic database 160. There are various ways for displaying map data graphically. Examples of methods that the map display application 168 can use are described in U.S. Pat. No. 6,092,076 and copending patent application Ser. No. 09/092,625, filed Jun. 5, 1998, the entire disclosures of which are incorporated by reference herein.

Another way that the route recorder application 136 can provide the route to the user/recorder 140 for review is to provide the user/recorder with a list of maneuvering instructions for following the route calculated by the route calculation application 156. The route recorder application 136 uses a route guidance application 172 for this purpose. The route guidance application 172 uses data from the geographic database 160. The maneuvering instructions provided by the route guidance application 172 include text that describes the route and in particular describes all the maneuvers required to follow the route. Examples of methods that the route guidance application 172 can use are described in copending patent application Ser. No. 08/893,201, filed Jul. 15, 1997, the entire disclosure of which is incorporated by reference herein.

When the route recorder application 136 provides data indicating the route to the user/recorder 140, it provides sufficient information so that the user/recorder can review each segment that forms the solution route. As part of this step, the route recorder application 136 also provides the user/recorder 140 with a means to select and change any portion of the route. As an example, if the solution route indicated a left turn at a particular intersection, the user/recorder 140, when reviewing the route, can change the route to a right turn.

In response to the review by the user/recorder 140, the route recorder application 136 receives the user/recorder's input (Step 176). The user/recorder's input may be to accept the route provided in Step 164. Alternatively, the user/recorder's input may include changes to the route based on the user/recorder's review.

If the user/recorder has made a change to the route, the change may affect several other road segments in the solution route. Accordingly, if the user/recorder 140 has made a change to the route, the route recorder application 136 obtains a new solution route that includes the change made by the user/recorder. First, the route recorder application 136 determines whether the user/recorder 140 has proposed a change to the route (Step 180). If the user/recorder 140 has proposed a change, the route recorder application loops back to the portion of the process at which the route to the destination is calculated (i.e., Step 152) and has a new route calculated (Step 182). When calculating a new route, the route calculation application 156 is constrained to use the change proposed by the user/recorder 140. When the new solution route is determined, it is provided to the user/recorder again for review, as described above. Thus, the user/recorder 140 can make iterative changes until the route is the exactly the way the user/recorder wants it.

If the user/recorder 140 has no more changes to the route (Step 180), the route recorder application 136 saves a data file 184 that defines the route determined by the user/recorder 140 (Step 188). The route recorder application 136 then ends (Step 192).

Referring again to FIG. 1, there are other systems, shown in the category of collection systems 100, that can be used to collect and record a route. These other systems operate similarly to the web-based system 112, described above. The standalone system 120 uses a computing system 200. The computing system 200 can be a personal computer, a terminal, an Internet appliance, a web-enabled phone, a PDA, a network, etc. A route recorder application 204 is locally on the computing system 200. The route recorder application 204 may include similar or identical steps as the route recorder application 136 described in FIG. 2. As in the embodiment described in FIG. 2, a user/recorder 140 uses the route recorder application 204 run on the computing system 200 to determine a route and save a data file that defines the route.

Another of the collection systems 100 is the vehicle-driven system 116. The vehicle-driven system 116 operates with a navigation system 208 which is located in a vehicle 212 of the user/recorder. The navigation system 208 is a combination of hardware and software components. Included among the software components of the navigation system 208 is an in-vehicle route recorder application 216. The in-vehicle route recorder application 216 is similar to the route recorder applications 136 and 204, described previously. The in-vehicle route recorder application 216 allows the user/recorder to determine and save data that define a route. The in-vehicle route recorder application 216 includes the additional function that it is able to record data about a route being driven by the vehicle 212.

Figure 3:
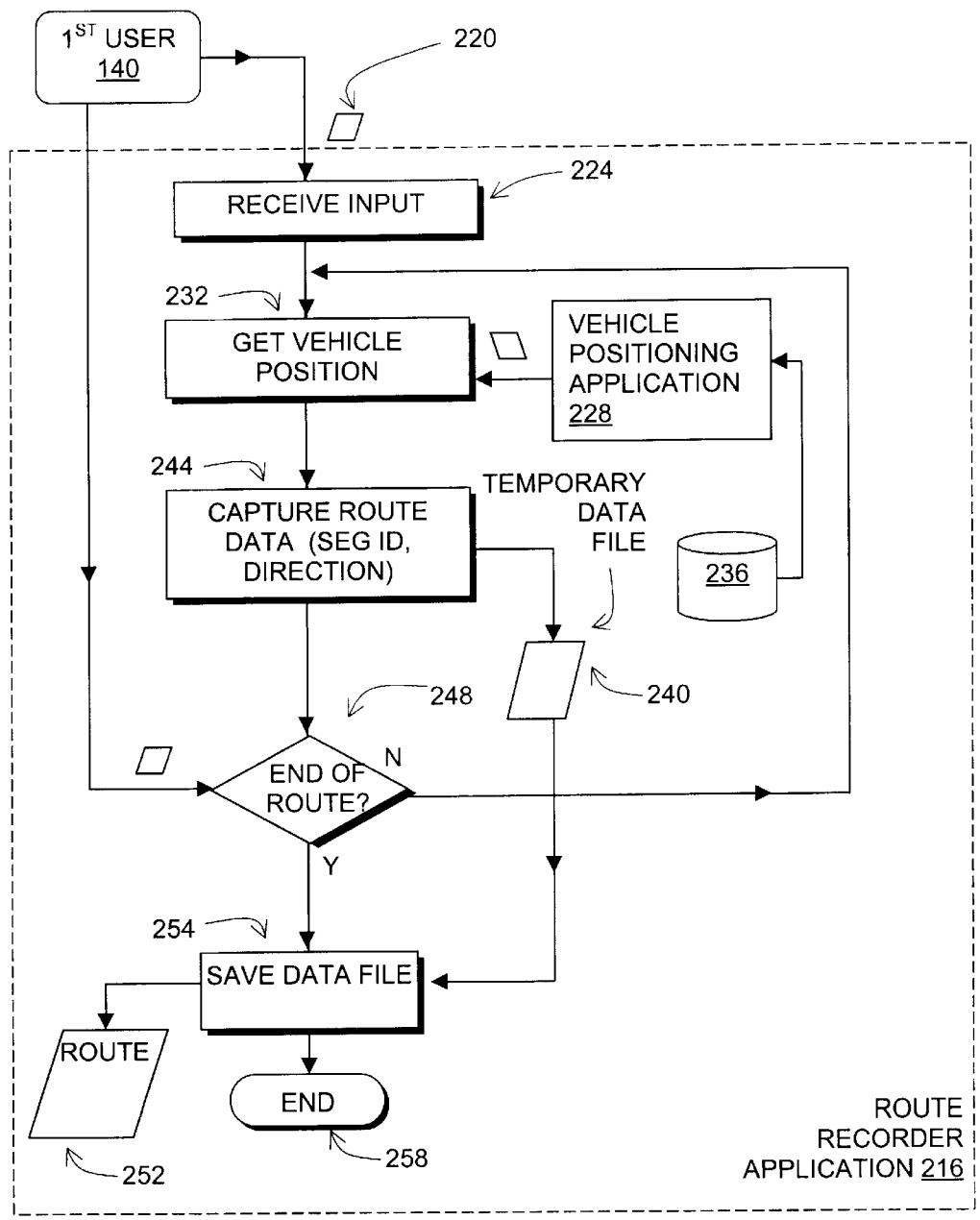
FIG. 3 is a flowchart showing the steps performed by the in-vehicle route recorder application in FIG. 1.

FIG. 3 is a flowchart that shows the steps performed in one embodiment of the in-vehicle route recorder application 216. The in-vehicle route recorder application 216 is used while the vehicle 212 is being driven along roads (214 in FIG. 1) in a geographic area (218 in FIG. 1). In FIG. 3, the in-vehicle route recorder application 216 receives input 220 from the user/recorder 140 to start recording data that defines a route (Step 224). The input from the user/recorder 140 may be received through the user interface of the navigation system 208. When the in-vehicle route recorder application 216 receives the indication to start recording a route, a call is made to a vehicle positioning application 228 to obtain data that identifies the current position of the vehicle 212 (Step 232). The vehicle positioning application 228 may be part of the software applications included in the vehicle navigation system 208. The vehicle positioning application 228 uses data from a geographic database 236 when performing this function. The geographic database 236 may be similar or identical to the geographic database 160, described above. Examples of methods that the vehicle positioning application 228 can use to determine the position of the vehicle are described in copending patent applications Ser. No. 09/276,377, filed Mar. 25, 1999, Ser. No. 09/680, 162, filed Oct. 5, 2000, and Ser. No. 09/680,161, filed Oct. 5, 2000, the entire disclosures of which are incorporated by reference herein.

In one embodiment, the vehicle positioning application 228 provides data that identify the road segment upon which the vehicle 212 is located, the position of the vehicle along the identified road segment, and the direction of travel of the vehicle along the identified road segment. The route recorder application 216 captures the data indicating the road segment upon which the vehicle is located (and optionally data indicating the vehicle position and direction) and saves the data in a data file 240 (Step 244). Newly received data are appended to previously received data so that the file 240 includes data that identify each road segment upon which the vehicle 212 traveled.

If the route recorder application 216 does not receive data indicating that route recording has stopped (Step 248), the process loops back to the step in which the vehicle position is obtained. In this manner, data indicating the vehicle position are obtained continuously as the vehicle is being driven. These data are obtained by the route recorder application 216 relatively frequently, e.g., every second, so that each road segment upon which the vehicle travels is identified and data indicating the road segment are stored in the data file 240.

Eventually, the route recorder application 216 receives data indicating that route recording should stop (Step 248). The data indicating that route recording should stop may be an indication from the user/recorder 140. The indication from the user/recorder may be made via a user interface of the navigation system 208. Alternatively, the data indicating that route recording should stop may be an indication that the vehicle has been turned off. This indication may be received from a controller associated with the vehicle ignition.

When the route recorder application 216 receives data indicating that route recording should stop, the temporary data file 240 is stored as a (relatively) permanent data file 252 (Step 254). The route recorder application 216 ends (Step 258).

C. Distribution Systems

Referring again to FIG. 1, after the user/recorder uses one of the collection systems 100 to define and store data defining a route, the data are distributed to other users. There are various systems that can be used for distributing the data that define routes. Some of these systems are indicated among the distribution systems 104 in FIG. 1.

One of the distribution systems 104 is a media-based system 264. The media-based system 262 uses physical media 266 to distribute the data defining a route that had been stored using one of the collection systems 100. The media may be CD-ROM disks, DVD disks, floppy disks, memory cards, EPROMs, tape, hard disks, or other kinds of media. According to this embodiment, the data defining a route that had been defined and saved using one of the collection systems 100 (184 in FIG. 2 or 252 in FIG. 3) are stored in one or more data files on the media 266. The media 266 are distributed to end user/recipients by any means. The media may be physically delivered by mail, hand-delivered, etc. The media used for distribution are selected so that they are compatible with the systems that the end user/recipients use to receive route calculation and guidance features. As an example, if an end user/recipient intends to use the data defining a route in a navigation system 268 installed in a vehicle 269, the media used for distribution should be compatible with the navigation system 268. The media are compatible if the end user/recipient can use the medium directly in his/her navigation system or if the end user has the means to convert or otherwise transfer the data defining a route from the medium used for distribution into the navigation system 268.

Another of the distribution systems 104 is a web-based system 270. The webbased system 270 includes a client system 274 and a server system 278. The client system 124 includes any type of device that can connect to the Internet 128, such as a personal computer, a terminal, an Internet appliance, a web-enabled phone, a PDA, etc. The server system 278 is accessed over the Internet 128 by the client system 274. The server system 274 includes a route distribution application 282. When a second user uses the client system 274 to access the server system 278 over the Internet 128, the route distribution application 282 allows the end user to download data that define a route. The data that the route distribution application 282 allows end user/recipients to download include the data defining routes that had been defined and saved using one of the collection systems 100.

Another of the distribution systems 104 is a wireless-based system 290. The wireless-based system 290 includes a wireless data transmitter 292. The wireless data transmitter 292 includes a communications system capable of transmitting data wirelessly. Such systems include those capable of relatively long-range data transmission, such as cellular, PCS, etc., as well as systems capable of relatively short-range data transmission, such as infrared, Bluetooth® systems, etc. Each end user/recipient has a receiver. The receiver is capable of receiving the data transmissions from the wireless data transmitter 292. The receiver may be part of a navigation system 298 installed in the end user/recipient's vehicle 300. Alternatively, the receiver may be part of a portable computing device 302, such as a PDA (e.g., a PalmPilot®-type device). The wireless data transmitter 292 transmits the data that define a route that had been saved using one of the collection systems 100 (184 in FIG. 2 or 252 in FIG. 3) to the end user/recipient's receiver. The end user/recipient's system receives the route data that had been transmitted and saves the data in a local data storage.

D. Utilization Systems

Referring still to FIG. 1, after an end user/recipient uses one of the distribution systems 104 to receive the data that define a route, the end user uses the data in a system that provides information for following the route. There are various systems that can be used to provide the end user/recipient with information for following the route that had been defined by an end user/recorder using one of the collections systems 100. Some of these systems are indicated among the utilization systems 108 in FIG. 1.

One of the utilization systems 108 is a vehicle navigation system 306. The vehicle navigation system 306 is installed in an end user/recipient's vehicle 310. The vehicle navigation system 306 may be similar or identical to the vehicle navigation system 208, described above, although the vehicle navigation system 306 in the end user/recipient's vehicle does not need to have the route recorder capability. The end user/recipient's navigation system 306 includes hardware and software for receiving the data that define a route (using any of the collection systems 100 and distribution systems 104) and using the data that define a route to provide the end user/recipient with information for following the route. If the data that define a route were provided on media (such as media 266), the end user/recipient's navigation system 306 includes a drive or slot capable of receiving the media and accessing and reading the data stored thereon that define a route. The drive or slot may be in addition to the drive or slot used by the end user/recipient's navigation system 306 for a geographic database. Alternatively, the geographic data base used by the user/recipient's navigation system 306 may be temporarily removed from its drive or slot, the media 266 containing the data that define a route installed in the drive or slot normally used for the geographic database, and then the data that define a route copied from the media 266 onto a data storage medium in the navigation system 306.

Once the end user/recipient's navigation system 306 has the data that define a route, the end user/recipient's navigation system 306 uses the data that define a route to provide route calculation and guidance. These functions can be provided by routines included in the route calculation and guidance applications included in the end user/recipient's navigation system. In many cases, the data that define a route will define only a portion of the entire route needed by the end user/recipient. As an example, the route defined by the data may relate to the road segments that a business wants delivery trucks to use to travel to the site of the business in order to avoid a school crossing. This defined route may represent only the last 2 miles before reaching the site of the business. The delivery trucks would still need to reach the beginning of the defined route. Accordingly, the route calculation program used by the end user/recipient's navigation system includes the capability to read the data file containing the defined route, calculate a route to the beginning of the defined route, and then incorporate the defined route into an entire solution route for the end user/recipient to follow to reach the destination. Once the route calculation function in the end user/recipient's navigation system incorporates the defined route into a solution route, route guidance for following the defined route can be provided in the same manner as any other route for which guidance is provided by the end user/recipient's navigation system.

Another of the systems included among the utilization systems 108 is a PDA 320 that provides route guidance functions. The PDA 320 may be carried by a person located in a vehicle 322. The PDA 320 includes software applications that use geographic data to provide routing instructions. The software applications in the PDA 320 may be similar or identical to those in the navigation system 306. The PDA may also include positioning equipment (such as a GPS system) that determines the location of the PDA 320. The navigation applications in the PDA 320 use the received data that define a route to provide guidance for following the defined route. The navigation applications in the PDA 320 may also include the capability to incorporate the defined route into an overall route, as described above in connection with the navigation system 306.

Another one of the utilization systems 108 is the vehicle navigation system 298 that obtains data that define a route wirelessly. This navigation system 330 was described in connection with the wireless-based distribution system 290. This navigation system 298 is installed in the vehicle 300. This navigation system 298 includes the hardware and software needed to receive data from the wireless distribution system 290. After the navigation system 298 receives the data that define a route from the transmitter 292 of the wireless-based system 290, the navigation system 298 uses the data to provide information for the end user/recipient to follow the route, similar to the navigation system 306, described above.

E. Data Compatibility

The end user/recipient systems (e.g., navigation systems 298 and 306 and PDA 320) in the utilization category 108 include the capability to read and use the data that define a route. There are several different ways that the end user/ recipient's navigation system can use to provide this capability.

In one alternative embodiment, the segments in the defined route are identified by ID's that are assigned by the geographic database developer. As an example, in geographic databases developed by Navigation Technologies Corporation of Rosemont, Ill., ID's are assigned to the data records that represent individual road segments. These ID's can be used in the route recorder applications (e.g., 126, 204 and 216 in FIG. 1) used by the end user/recorders to define routes. Then, when the defined routes are used by the end user/recipient systems, the route calculation application in the end user/recipient systems use the ID's to identify the road segments that form the defined route.

Under some circumstances, ID numbers assigned to road segments may change. As an example, ID numbers assigned to road segments may change in different versions of the geographic database. According to one embodiment, translation tables are used to translate ID numbers assigned to road segments from one version to another version.

According to another embodiment, the individual road segments that form the defined route are identified in terms of their coordinates (i.e., latitude and longitude). Each road segment can be identified by its coordinates (i.e., the latitude and longitude of its end points). According to this alternative, the route recorder application (126, 216, or 204 in FIG. 1) stores data that identify the coordinates (i.e., latitude and longitude of the end points) of each road segment in the defined route. Then, the end user/recipient's navigation system uses the data that identify the coordinates of the road segments to identify the actual road segments in the defined route.

According to another alternative embodiment, the road segments that form the defined route are identified by street names, directions and distances. According to this alternative, the route recorder application (126, 216, or 204 in FIG. 1) stores data that identify the defined route using the names of the streets (e.g., "HIGGINS", "MANNEHEIM", etc.), the direction along each street (e.g., "NORTH", "WEST", etc.) and distance (e.g., "TRAVEL 3 MILES"). In the end user/recipient's system, these recorded data are used to identify the actual route segments that make up the defined route. These actual road segments are identified using the database in the user/recipient's system. After the actual road segments that form the defined route are identified in terms of the database in the end user/recipient's system, route guidance for following the defined route is determined by the end user/recipient's system and provided to the end user/recipient.

EXAMPLE

One example of how the ability to exchange route data can be used is described in the following example.

Two persons located some distance apart want to meet at a location that is convenient for both of them. Navigation systems that find convenient places for two persons to meet are disclosed in the copending patent application entitled "METHOD AND SYSTEM FOR PROVIDING RELATED NAVIGATION SERVICES FOR TWO OR MORE USERS", Attorney Docket No. N0075US. In some of the embodiments, this determination is made by finding places of a specified type that would take approximately the same driving time for both persons to reach. In some of the embodiments disclosed in this copending patent application, after a location that is convenient for both persons is selected, guidance for traveling to the selected location is provided to both persons. A consideration related to this feature is that determination of a convenient meeting place for both persons (i.e., taking into account the locations of both persons) is performed on one navigation system, but the guidance for traveling to the selected meeting place may be provided by two navigation systems, one associated with each person. Accordingly, in these embodiments, there is a need for the one navigation system that determines the convenient meeting place to transmit data that defines the route to the other navigation system to provide guidance for one of the persons to reach the selected destination. Embodiments in the present application provide this capability.

According to this example, after a place for two persons to meet is determined using one navigation system, data that identify the route for the other person to travel to reach the selected destination are transmitted to the other person so that the other person can use the data in his/her navigation system in order to follow the route.

It is intended that the foregoing detailed description be regarded as illustrative rather than limiting and that it is understood that the following claims including all equivalents are intended to define the scope of the invention.

We claim:

1. A method of providing end users with the ability to exchange routing data, the method comprising:

providing a route recorder application on a first computing system, wherein the route recorder application provides a first end user with the ability to define a route formed of specific road segments and store data that represent each of the specific road segments comprising the route in a data file;

distributing the data file to a second end user, wherein the second end user is different than the first end user; and using the data that represent the route in a second computing system to provide the second end user with guidance for following the route.

2. The method of claim 1 wherein the step of distributing includes providing a physical medium with the data file stored thereon to the second end user.

3. The method of claim 1 wherein the step of distributing includes transferring the data file wireless to the second computing system of the second end user.

4. The method of claim 1 wherein the route recorder application is located on a server that the first end user accesses over a network.

5. The method of claim 4 wherein the network includes the Internet.

6. The method of claim 1 further comprising:

with the route recorder application, providing the first end user with data defining a trial route; and accepting input from the first end user that changes the trial route, wherein the data that represent the route that are stored in the data file by the route recorder application include data that represent the trial route as changed in accordance with the input from the first end user.

7. The method of claim 1 further comprising:

determining a position of a vehicle in which the first user is traveling;

identifying road segments upon which the vehicle is traveling; and using the identified road segments to define the route that is stored in the data file by the route recorder application.

8. The method of claim 1 wherein said first computing system is a standalone system.

9. The method of claim 1 wherein the data that represent the route in the data file include ID's of data records that represent the road segments that form the route.

10. The method of claim 1 wherein the data that represent the route in the data file include geographic coordinates of the road segments that form the route.

11. The method of claim 1 wherein the data that represent the route in the data file include street names of the road segments that form the route.

12. The method of claim 11 wherein the data that represent the route in the data file include directions and distances along roads that form the route.

13. The method of claim 1 wherein the route leads to a destination at which the first user and the second user plan to meet.

14. The method of claim 1 further comprising:
   on the first computing platform, determining a convenient place for the first user and the second user to meet taking into account current locations of the first user and the second user,
   wherein an origin of the route is the current location of the second user and a destination of the route is the convenient place for the first user and the second user to meet.

15. The method of claim 1 wherein the second computing system is a vehicle navigation system.

16. The method of claim 1 wherein the second computing system provides the second end user with guidance for reaching an origin of the route.

17. The method of claim 1 wherein the second computing system incorporates the route provided from the first user into another route.

18. A method of providing end users with an ability to exchange routing data, the method comprising:
   using a positioning system to determine positions of a first end user as the first end user travels along a route formed of road segments;
   using the positions of the first end user to determine the route traveled by the first end user;
   storing data that indicate the route traveled by the first end user in a data file; and
   using the data that represent the route on a computing system to provide a second end user with guidance for following the route.

19. The method of claim 18 further comprising:
   after the step of storing, distributing the data file to the second end user.

20. A method of providing end users with an ability to exchange routing data, the method comprising:
   a first user with a first computing system, defining a route formed of specific road segments and storing data that represent the route comprising the specific road segments in a data file;
   distributing the data file to a second computing system;
   with the second computing system, using the data that represent the route to formulate guidance for following the route; and
   with the second computing system, providing the guidance to follow the route to a second end user, wherein the second end user is different than the first end user.

* * * * *